(12) United States Patent
Maheshwari et al.

(10) Patent No.: US 6,446,941 B1
(45) Date of Patent: Sep. 10, 2002

(54) COOLING TOWER AND METHOD FOR OPTIMIZING USE OF WATER AND ELECTRICITY

(75) Inventors: Gopal P. Maheshwari; Eitidal Al-Bassam, both of Safat (KW)

(73) Assignee: Kuwait Institute for Scientific Research, Safat (KW)

( * ) Notice: Subject to any disclaimer, the term of this patent is extended or adjusted under 35 U.S.C. 154(b) by 0 days.

(21) Appl. No.: 09/686,222

(22) Filed: Oct. 11, 2000

(51) Int. Cl.$^7$ ................................................. B01F 3/04
(52) U.S. Cl. ........................ 261/130; 261/153; 261/157; 261/30; 261/DIG. 11; 165/900
(58) Field of Search ................................. 261/129, 130, 261/131, 137, 152, 153, 156, 157, 30, DIG. 11; 165/110, 121, 900

(56) References Cited

U.S. PATENT DOCUMENTS

| | | | |
|---|---|---|---|
| 4,252,751 A | * | 2/1981 | Shito .................... 261/DIG. 11 |
| 6,142,219 A | * | 11/2000 | Korenic et al. ............. 261/152 |
| 6,213,200 B1 | * | 4/2001 | Carter et al. ................. 261/153 |
| 2001/0002620 A1 | * | 6/2001 | Carter et al. ................. 261/153 |

* cited by examiner

*Primary Examiner*—C. Scott Bushey
(74) *Attorney, Agent, or Firm*—Dennison, Schultz & Dougherty

(57) ABSTRACT

A forced air cooling tower includes an upright casing, and elevated water distribution system disposed in an upper portion of the casing and one or more fans for drawing air through the tower. The tower also includes a catch basin for collecting the cooled air and a pump for circulating the cooled water through a condenser and back to the top of the tower and to the water distribution system. The cooling tower also includes a controller and a variable frequency device for regulating the flow of air through the tower. A first temperature sensor senses the temperature $T_1$ of the hot process water delivered to the water distribution system and a second sensor senses the dry bulb temperature of the air leaving the tower $T_{dbt2}$. A third sensor senses the temperature of the cooled water leaving the tower. The controller such as a computer and variable frequency drive controls the speed of the fan to minimize the difference in $T_1$ and $T_{dbt2}$. A submaster control prevents the fan speed from being further reduced when a predetermined $T_2$ (temperature of the cooled water) is reached.

4 Claims, 3 Drawing Sheets

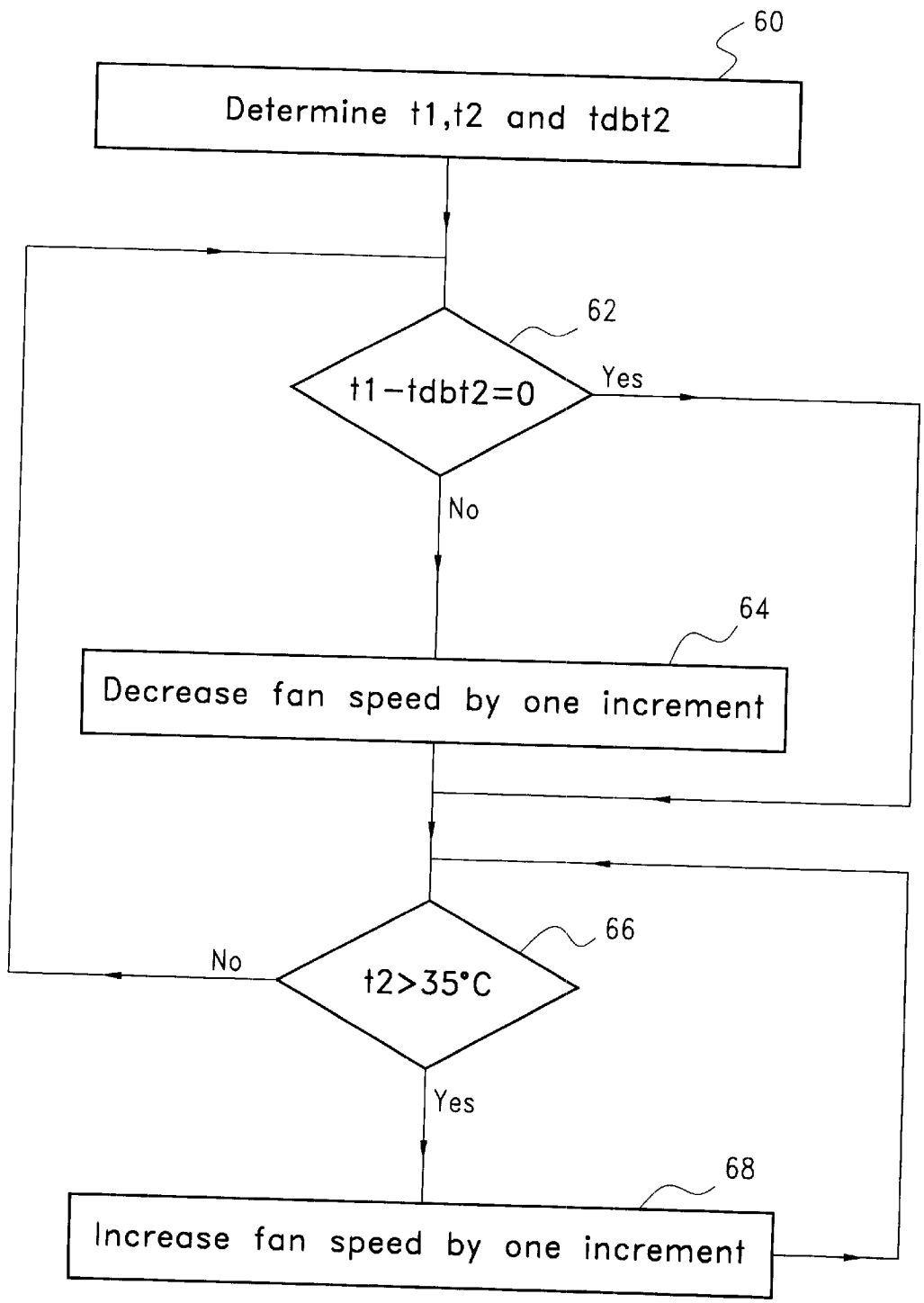

COOLING TOWER AND METHOD FOR OPTIMIZING USE OF WATER AND ELECTRICITY

FIELD OF THE INVENTION

This invention relates to cooling towers and to methods for optimizing the use of water and electricity in such towers. The invention relates more particularly to forced air cooling towers for an air conditioning system and a method for optimizing the use of water and electricity in such systems.

BACKGROUND FOR THE INVENTION

Air conditioning is a necessity for comfortable living in Kuwait and certain other countries and regions of the world. In such regions, where the summer months are extremely hot, systems with water cooled condensers are frequently relied upon for cooling residential and non-residential buildings. They are frequently relied upon because they consume less electricity and need-less power during peak hours. For example, studies have shown that systems with water cooled condensers consumed 25% less electricity and needed 40% less power at peak loads than other air conditioning systems.

In a system with a water cooled condenser as described herein, the cooling tower is a key piece of equipment. Commonly used counterflow water cooling towers comprise an upright casing which supports an elevated water distribution system, an underlying fill and means such as a powered fan or fans for drawing ambient-derived air currents into and through the tower casing and fill. They also include a water collection basin for collecting the cooled water. The distribution system serves to receive initially hot water from the condenser of an air conditioning system and distribute the same by gravitation through the underlying fill structure. The latter can be of the splash or film variety, but in all cases serves to effect a thermal interchange relationship between the initially hot water descending through the fill and the counter currently upwardly flowing air currents. In such towers, thermal energy is transferred to the ambient air through a humidification process.

Cooling towers use a large flow of air in providing cooler water temperatures to thereby improve the performance of the air conditioning systems. However, this improved performance significantly increases the costs for the increase in fan power and water consumption. This latter is of special concern in Kuwait and other countries where the soft water is produced through sea water desalination. In the prior art cooling towers, the temperature of the water leaving the cooling tower is the controlling parameter and the reduction of the leaving water temperature is controlled by the air flow through the tower. This approach has been universally practiced.

In the present invention, the dry bulb temperature of the air leaving the cooling tower is used as an additional parameter along with the temperature of the water leaving the cooling tower which is fixed by the designer of the air conditioning system. For example, using the dry bulb temperature of the leaving air to control air flow to allow only minimum moisture evaporation to meet the cooling demand can be used to reduce the electricity and water consumption. This can be achieved by keeping the dry bulb temperature of the air leaving the cooling tower close to the entering water temperature in the cooling tower.

SUMMARY OF THE INVENTION

In essence, the present invention contemplates a cooling tower for use in air conditioning system for cooling residential and non-residential buildings in areas of high temperature and particularly in areas of extreme heat. The cooling tower comprises a generally horizontal water collection basin and an upright casing above the collection basin. The tower also includes an air inlet in a lower portion thereof and an air outlet in an upper portion or top of the tower in a conventional manner. Means such as one or more fans are provided in an upper portion of the tower for inducing a flow of initially ambient air through the air inlet and up through and out of the tower. The cooling tower also includes a hot water distribution system for dispersing hot process water in an upper portion of the tower for gravitation through the flow of rising air so that the water is cooled by evaporation as it descends into the water collection basin. The cooling tower also includes means for sensing the temperature of the hot process water delivered to the hot water dispersing means and means for sensing the dry bulb temperature of the air leaving the cooling tower. Means are also provided for controlling the rotational speed to the fan or fans to maintain the dry bulb temperature of the air leaving the tower to approximately the temperature of the hot process water delivered to the hot process water dispersing means. In effect, the means for controlling the fan or fans will minimize the difference between the dry bulb temperature of the air leaving the tower and the temperature of the hot process water delivered to the hot water dispersing means.

In a preferred embodiment of the invention, the control will reduce the difference between the hot process water ($T_1$) and the dry bulb temperature of the air leaving the tower ($T_{db2}$) to approach 0. This temperature difference represents a master control for regulating the air flow through the cooling tower by a variable frequency drive. The maintenance of the leaving water temperature to a predetermined value is then achieved by a sub-master control which will not allow the fan speed to be reduced further in case the temperature of the cooled water ($T_2$) reaches the predetermined value.

The invention will now be described in connection with the accompanying drawings wherein like reference numerals have been used to designate like parts.

DESCRIPTION OF THE DRAWINGS

FIG. 3 is a flow diagram which illustrates the manner in which the fan control may be implemented in practicing the present invention.

DETAILED DESCRIPTION OF THE PREFERRED EMBODIMENTS OF THE INVENTION

Counterflow water cooling towers for use in air conditioning systems are well known. For example, one such system is disclosed in the U.S. Pat. No. 5,364,569 of Bugher III which is incorporated herein in its entirety by reference. It is also well known that the measure of cooling tower efficiency is a function of wet bulb temperature as disclosed in the U.S. Pat. No. 5,600,960 of Schwedler et al. which is also incorporated herein in its entirety by reference. The Schwedler et al. patent discloses a method of minimizing energy usage in a chiller and cooling tower system.

An improved cooling system and method for cooling the air in an enclosed space is disclosed in Braun et al. U.S. Pat. No. 5,040,377 which is also incorporated herein in its entirety by reference. As disclosed therein, that system includes an improved fan control and method for controlling the speed and sequence of a plurality of fans which cool the water used in a condenser water loop so that a total power consumption of the system can be minimized.

Cooling systems or air conditioners generally include a condenser, a water loop having a cooling tower which includes a plurality of fans to provide cooled water to a condenser. Each fan is driven by a fan motor which consumes power. As the flow provided by the fans is increased due to increased fan speed, an increased amount of heat and water are transferred from the water to the external air. Therefore, increased fan speed results in increased power and water consumption.

Such systems also include a chiller which conducts a refrigerant through the condenser and an evaporator under the influence of a pressure differential provided by a compressor. The compressor includes a motor which consumes power and the power consumption of the compressor motor and the chiller power increases as the pressure differential is required to increase. Therefore, through proper cooling tower fan control the overall power consumption can be minimized.

In the aforementioned system of Braun et al., the power consumption of a cooling system is reduced by controlling the speed of the cooling tower fans. That system and method utilize an open loop control of the cooling fans and by determining simple estimates of control parameters by utilizing fixed cooling system design information.

The present invention relates primarily to cooling towers and to an improved method for minimizing water and power consumption in such systems. Such systems may, for example, be incorporated in air conditioning systems such as those disclosed in the aforementioned Braun et al. patent and may utilize control means for controlling the fan speeds which are similar to those disclosed in the Braun patent. The modification of such control systems for use in the present invention will be understood by those of ordinary skill in the art.

Figure 1:
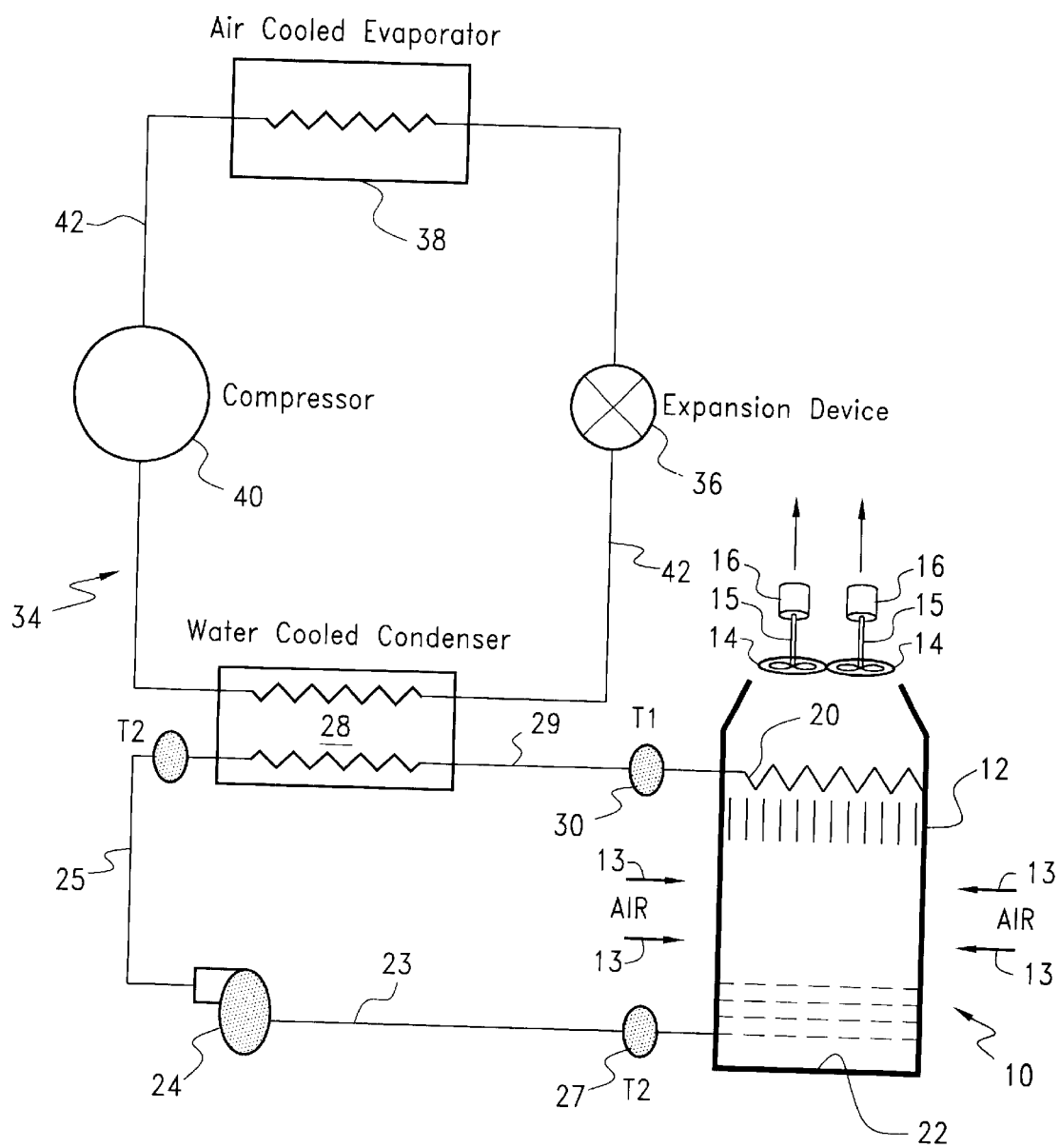
FIG. 1 is a schematic illustration of an air conditioning system which incorporates a cooling tower in accordance with the present invention.

As illustrated in FIG. 1, a forced air cooling tower 10 is shown as part of a cooling system for cooling a residential or non-residential building or area. The cooling system apart from the cooling tower 10 and control therefore is of a conventional design and may take many forms. As shown, the cooling tower 10 includes an upright casing 12 and may be designed using conventional parameters for a given location.

The upright or generally vertical casing 12 defines a vertical channel for an upwardly moving column or flow of air. The ambient air enters through a plurality of openings in the casing as indicated schematically by the arrows 13. These openings or arrows 13 like the casing 12 are of a conventional design as will be well understood by persons of ordinary skill in the art of designing cooling towers.

The cooling tower 10 also includes one or more fans 14 disposed in an upper portion of the tower for drawing ambient air into and up through the tower. In other words, the fans 14 induce a flow of air through and out of the tower. Each of the fans 14 are driven by a motor 16 by means of a shaft 15 in a conventional manner. One or more fans 14 may be used and each may be of a single, multiple speed or variable speed type.

As in conventional cooling towers, the cooling tower 10 includes a hot process water distribution system 20 for distributing or dispersing hot process water in an upper portion of the tower for gravitation through the flow of air so that the water is cooled by evaporation and/or contact with air as it descends into a generally horizontal water collection basin 22. The system 20 distributes the hot process water across a horizontal section of the draft channel so that the free falling process water droplets are in substantially counterflowing direct heat exchange contact.

It should be recognized that in many, if not most regions of the world, the ambient air temperature which is drawn into the casing 12 is cooler than the hot process water to be cooled. However, in Kuwait, other gulf coast countries and some other regions of the world the dry bulb temperature of the ambient air may at times be higher than the temperature of the hot process water entering the tower. In either event, the hot process water is cooled by evaporation or by a humidification process. However, that process also cools the air. This cooling of the air is achieved at the expense of power and water consumption. Therefore, the cooling tower in accordance with the present invention is designed to minimize the effect by regulating the flow of air so that the dry bulb temperature of the air exiting the tower is approximately equal to the temperature of the hot process water which is distributed across a horizontal section of the draft channel as free falling droplets. These free falling droplets are then in substantial contact allowing direct heat exchange contact with the upward flow of air.

It is presently estimated that the difference between the temperature of the hot process water entering the tower and the dry bulb temperature of the air leaving the tower will approach 0° C. and can be maintained within 1 or 2° C. It should also be recognized that the dry bulb temperature of the exiting air will not exceed the temperature of the hot process water entering the tower.

As illustrated in FIG. 1, the cooled process water at a temperature of $T_2$ is collected in the catch basin 22 and is pumped through a conduit or pipe 23 by a pump 24. This cooled process water passes through the pump 24, a second conduit 25, a flow meter 26 (shown in FIG. 2) and into a condenser 28. The cooled process water is reheated in the condenser 28 and delivered to the hot process water distribution system 20 by means of a conduit 29. A temperature sensor 30 is disposed within the conduit 29 for sensing the temperature $T_1$ which is delivered to the water distribution system 20. A separate temperature sensor 27 for sensing the temperature $T_2$ of the cool process water as it leaves the catch basin 22 is disposed in the conduit 23.

The cooling tower 10 in accordance with the present invention may be incorporated in an air conditioning system wherein the balance of the system is of a conventional design. For example, a chiller 34, a portion of an air conditioning system includes a condenser 28, a valve 36, evaporator 38 and a compressor 40. The chiller 34 also includes a first conduit 42 for circulating a refrigerant contained therein through the condenser 28, valve 36, evaporator 38 and compressor 40 in a conventional manner.

Figure 2:
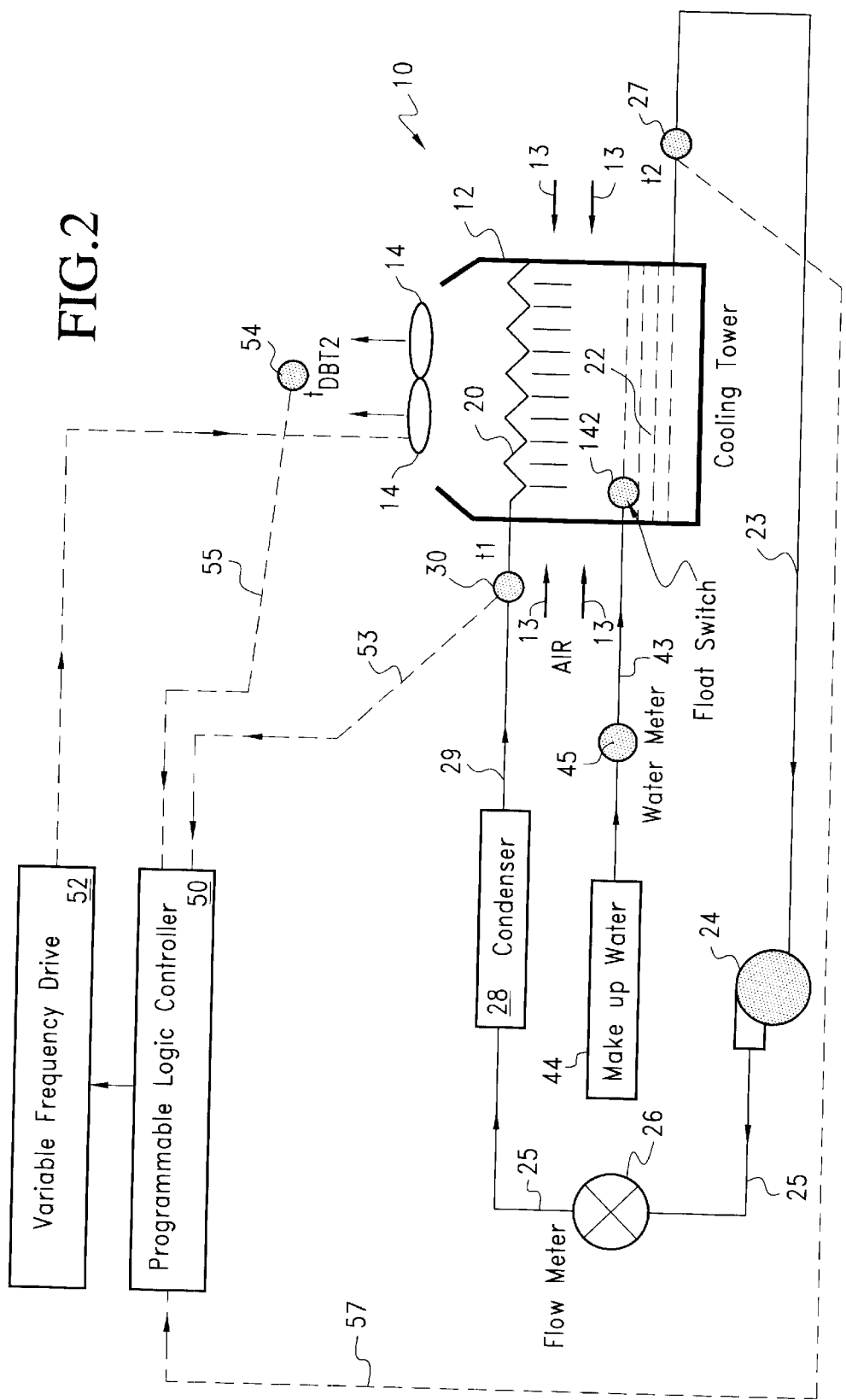
FIG. 2 is a schematic illustration of a cooling tower in accordance with a preferred embodiment of the invention.

As illustrated in FIG. 2, the cooling tower 10 includes a float switch 142 in the catch basin 22. The float switch is connected to a source of makeup water 44 by means of a conduit 43 and a water meter 45 is disposed in the conduit for measuring the amount of water which is added to the system.

The rotational speed of the fan or fans 14 is controlled by a computer program, electrical circuit or the like. For example, a controller 50 receives signals from a temperature sensor 54 which senses the dry bulb temperature of the air leaving the tower 10. The controller 50 also receives signals from the sensors 30 and 27 which indicate the temperature of the hot process water entering the tower and the cool process water leaving the tower respectively.

The controller 50 which is preferably in the form of a computer with appropriate software controls the fan speed by means of a variable frequency drive 52. For example, the controller 50 receives a signal indicative of the temperature $T_1$ of the hot process water from the sensor 30 as indicated by a dotted line 53. This temperature $T_1$ is the temperature of the hot process water as it enters the tower 10 and is delivered to the water distribution system 20. The controller 50 also receives a signal indicative of the dry bulb temperature of the air leaving the tower from a temperature sensor 54 as indicated by the dotted line 55. In addition, the controller 50 receives a third signal from the temperature sensor 27 as indicated by the line 57. This latter signal is indicative of the temperature of the cooled process water as it leaves the tower 10.

A program for controlling the variable frequency drive 52 compares the temperature $T_1$ of the hot process water with the dry bulb temperature of the air leaving the tower $T_{dbt2}$ and includes a master control for regulating the air flow through the cooling tower. To be more specific, the master control is based on reducing the difference between $T_1$ and $T_{dbt2}$ to approximately 0, for example, between 0 and 1 or 2° C. The maintenance of the leaving water temperature to a fixed desirable value or predetermined constant as for example 85° F. will then be achieved by a submaster control which will not allow the fan speed to be reduced further when $T_2$ reaches the predetermined value. The programming of the aforesaid process is considered to be conventional and well within the skill of an ordinary programmer in the field of controls for cooling towers.

FIG. 3 is a flow chart which illustrates the manner in which the fan control may be implemented in accordance with the present invention. As shown therein, in step 60, the controller 50 (FIG. 2) senses or detects the temperature $T_1$, of the hot water which is delivered to the top of the cooling tower 10, the temperature $T_2$ of the cooled water leaving the cooling tower 10 and the dry bulb temperature of the air leaving the tower $T_{dbt2}$. Then, if $T_1-T_{dbt2}$ does not equal 0 as determined in step 62, the controller 50 reduces the fan speed by one increment in step 64. However, if $T_1-T_{dbt2}$ equals 0 in step 62, the program bypasses the decreased fan control (step 64) and proceeds to step 66. In step 66, the controller 50 determines whether or not $T_2$ is greater than 35° C. or some other predetermined value. If $T_2$ is not greater than the predetermined value, the program cycles back to step 62. However, if $T_2$ is greater than the preselected value, the controller 50 increases the fan speed by one increment in step 68 and the program recycles to step 66 until $T_2$ is not greater than the preselected value.

While the invention has been described in connection with preferred embodiment, it should be recognized that changes modifications may be made therein without departing from scope of the appended claims.

What is claimed is:

1. A cooling tower for an air conditioning system comprising an air inlet for receiving a flow of inlet air and a generally vertical axis draft channel disposed above said air inlet, a fan and means for controlling the rotational speed of said fan to thereby control the flow of air through said draft channel, hot process water dispersing means disposed within said draft channel and above said air inlet for direct heat exchange contact of dispersed hot process water with air flow from said inlet to thereby cool the temperature of said hot process water, a heat exchange unit and means for circulating cooled process water from a lower portion of said cooling tower through said heat exchange unit wherein the cooled process water picks up heat and is circulated back to said hot water dispersing means, means for sensing the temperature of the hot process water delivered to said hot water dispersing means, means for sensing the dry bulb temperature of the air leaving the cooling tower and means for controlling the rotational speed of the fan based on the sensed temperature of the hot process water and the sensed dry bulb temperature of the air to maintain the dry bulb temperature of the air leaving the tower to approximately the temperature of the hot process water dispersed by said dispersing means whereby only minimum moisture evaporation and minimal electricity are used.

2. A cooling tower according to claim 1 wherein said hot water dispersing means distributes said process water across a horizontal section of said draft channel as free falling droplets.

3. A cooling tower according to claim 2 wherein said inlet air and free falling process water droplets are in substantially counterflowing direct heat exchange contact.

4. A counterflow water cooling tower comprising a generally horizontal water collection basin and an upright casing above said collection basin, an air inlet in a lower part of said upright casing and an air outlet in an upper portion of said upright casing, a fan for inducing a flow of ambient derived air currents through said air inlet and upwardly through said casing for discharge through said air outlet, a hot process water distribution system disposed in an upper portion of said upright casing for receiving hot water and distributing the hot water for gravitation through the flow of ambient air currents, means for sensing the temperature of the hot water delivered to said hot water distribution system, means for sensing the dry bulb temperature of the air leaving said air outlet means for regulating the speed of the fan in response to the sensed temperature of the hot process water and the sensed dry bulb temperature of the air leaving said air outlet so that the dry bulb temperature of the leaving air is approximately equal to the temperature of the water delivered to said distribution system to thereby optimize the use of electricity and water.

* * * * *